(12) United States Patent
Berlin

(10) Patent No.: US 7,302,564 B2
(45) Date of Patent: Nov. 27, 2007

(54) TRANSLATION OF SECURE COMMUNICATIONS FOR HANDSHAKE PROTOCOLS

(75) Inventor: Volker Jens Berlin, Berlin (DE)

(73) Assignee: i-net Software GmbH, Berlin (DE)

( * ) Notice: Subject to any disclaimer, the term of this patent is extended or adjusted under 35 U.S.C. 154(b) by 813 days.

(21) Appl. No.: 10/743,772

(22) Filed: Dec. 24, 2003

(65) Prior Publication Data

US 2005/0149718 A1 Jul. 7, 2005

(51) Int. Cl.
*H04L 9/00* (2006.01)
*H04L 9/32* (2006.01)

(52) U.S. Cl. .......................... 713/151; 713/168; 726/3

(58) Field of Classification Search ................ 726/2–3, 726/14; 713/168, 189, 150–152
See application file for complete search history.

(56) References Cited

U.S. PATENT DOCUMENTS

| | | | |
|---|---|---|---|
| 5,899,990 | A | 5/1999 | Maritzen et al. |
| 6,360,223 | B1 | 3/2002 | Ng et al. |
| 6,385,618 | B1 | 5/2002 | Ng et al. |
| 7,139,894 | B1 * | 11/2006 | Mensching et al. .......... 711/170 |
| 2003/0217292 | A1 * | 11/2003 | Steiger et al. ............... 713/201 |

OTHER PUBLICATIONS

"SQL Middleware: HiT JDBC/400", *available at* http://www.hitsw.com/products_services/sq1400/jdbc400/jdbc400_dsheet.html, available at least as of Dec. 24, 2003.

Kabutz, Heinz, "Microsoft's JDBC Driver for SQL Server Stacks Up Against Competition", 2003, pp. 1-3, *available at* http://www.devx.com/Java/Article/16356.

"SQL Access for DB2 Middleware", *available at* http://www.microway.com.au/catalog/hit/db2_jdbc.stm, available at least as of Dec. 24, 2003.

"SequeLink JDBC Driver Reference, Chapter 4, Using SSL Encryption", 1999, pp. 1-11, *available at* http://datadirect-technologies.com/download/docs/Sequelnk/javaref/sslencry.htm.

"FAQ-JDBC", IDS Software, 1997-2002, pp. 1-6, *available at* http://idssoftware.com/faq-j.html.

Dierks, T., et al., "The TLS Protocol Version 1.0", Jan. 1999, pp. 1-75, *available at* http://www.ietf.org/rfc/rfc2246.txt.

Freier, Alan O., et al., "The SSL Protocol, Version 3.0", Mar. 1996, *available at* http://wp.netscape.com/eng/ssl3/ssl-toc.html.

"Java Secure Socket Extension (JSSE) Reference Guide for the Java 2 SDK, Standard Edition, v. 1.4.2", 1994-2004, Sun Microsystems, Inc., pp. 1-81, *available at* http://java.sun.com/j2se/1.4.2/docs/guide/security/jsse/JSSERefGuide.html.

* cited by examiner

*Primary Examiner*—Hosuk Song
(74) *Attorney, Agent, or Firm*—Cooley Godward Kronish LLP

(57) ABSTRACT

Systems and methods of the invention provide translation of secure communications for handshake protocols. A system is provided that includes a first client application, a server application, and a translation component. The first client application is configured to transmit and receive communications via a network. The server application configured to receive queries from at least one client application via the network and to transmit responses to at least one client application via the network. The translation component is configured to receive communications from the first client application and translate the received communications into queries that are understandable to the server application.

53 Claims, 9 Drawing Sheets

TRANSLATION OF SECURE COMMUNICATIONS FOR HANDSHAKE PROTOCOLS

FIELD OF THE INVENTION

The invention concerns translation of secure communications for handshake protocols. More specifically, one or more embodiments of the invention provide the ability to translate Secure Sockets Layer (SSL) communications for use in one or more Structured Query Language (SQL) databases.

BACKGROUND

Over the past several years, the Internet and other computer networks have become increasingly accepted and popular as conduits for conducting business and performing other sensitive transactions. For example, online shopping, banking, and security trading over the Internet, all of which can involve the transmission of sensitive, personal, and financial information, have become commonplace.

As activities requiring sensitive transactions have become more commonplace, so too have security concerns surrounding these transactions. In response, several security features have been implemented to secure sensitive transactions over the Internet and other computer networks. For example, a Secure Sockets Layer (SSL) has been developed to establish a secure communications link or connection between a client and a server. This secure connection is established using a public key cryptography technique, whereby a secret key for the session is exchanged as the server transmits its public encryption key to the client, and the client randomly generates a private key that is encrypted using the public key and transmitted back to the server.

Communications over computer networks using a variety of protocols can be made more secure using SSL. One example of such a communications protocol that occurs via the World Wide Web (WWW) is the Hypertext Transport Protocol (HTTP), which can be accomplished over SSL using HTTP over SSL, which is also referred to as Hypertext Transport Protocol Secure (HTTPS). Similarly, other communications protocols can be used over SSL, such as the File Transfer Protocol (FTP), the Simple Mail Transfer Protocol (SMTP), and others. Frequently, communications over SSL use a different Transmission Control Protocol/Internet Protocol (TCP/IP) port than non-secure or unencrypted communications. For example, standard HTTP communications use port 80, while HTTPS communications often use port 443.

Some applications and servers, however, do not follow the convention of using different communications channels (e.g., communicating via different TCP/IP ports) for encrypted and unencrypted communications. For example, some servers that service incoming requests, such as structured query language (SQL) requests, use the same communications channel (e.g., TCP/IP port 80) for both unencrypted and encrypted communications (e.g., communications over SSL).

One example of such a server that uses the same communications channel for both unencrypted communications and encrypted communications over SSL is the SQL server available from Microsoft Corp (referred to herein as the MS SQL Server). The MS SQL Server (which is used generically herein as referring to MS SQL Server 2000, or other comparable versions of the MS SQL Server) includes the SSL handshake as part of the standard Tabular Data Stream (TDS) handshake used by the server. Because this SSL handshake is packaged within the proprietary TDS handshake of the server, however, standard SSL software libraries cannot be used to service the SSL communications transmitted to and received from the server.

Therefore, it is desirable to provide a technique that allows standard libraries to service encrypted communications, such as SSL communications, transmitted to and received from a server that packages the encryption handshake protocol associated with the encrypted communication in a proprietary handshake protocol.

SUMMARY

Accordingly, one or more embodiments of the invention provide translation of secure communications for handshake protocols. For example, according to an embodiment of the invention, a method is provided that receives encrypted data transmitted over a network, determines whether a handshake protocol is required to handle the encrypted data, initiates a handshake protocol, if it is determined that a handshake protocol is required, and transmits the encrypted data after the handshake protocol has been executed.

According to another embodiment of the invention, a method is provided that initiates a handshake protocol, determines if data to be transmitted is encrypted. If it is determined that the data is encrypted, the method initiates a secure protocol and transmits the encrypted data.

According to another embodiment of the invention, a system is provided that includes a first client application, a server application, and a translation component. The first client application is configured to transmit and receive communications via a network. The server application configured to receive queries from at least one client application via the network and to transmit responses to at least one client application via the network. The translation component is configured to receive communications from the first client application and translate the received communications into queries that are understandable to the server application.

Further features of the invention, and the advantages offered thereby, are explained in greater detail hereinafter with reference to specific embodiments illustrated in the accompanying drawings, wherein like elements are indicated by like reference designators.

DETAILED DESCRIPTION

Systems and methods of the invention provide translation of secure communications for handshake protocols. For example, one or more embodiments of the invention provide translation of a secure communication, such as an encrypted communication (e.g., SSL, etc.), for use by or received from a proprietary server handshake protocol. According to one or more embodiments of the invention, translation of SSL communications for structured query servers (e.g., SQL servers, MS SQL Server, etc.) that use proprietary handshake protocols can be accomplished by providing one or more translation layers that allow a standard SSL library, such as the Java Secure Socket Extension (JSSE), to support the proprietary handshake. This compatibility is facilitated by an additional layer that is translated from the protocol of the standard SSL library to the handshake protocol of a structured query server (e.g., the MS SQL Server, etc.). For example, translation to or from a structured query handshake protocol that uses named pipes can be achieved according to one or more embodiments of the invention.

According to an embodiment of the invention, a method is provided that receives encrypted data transmitted over a network, determines whether a handshake protocol is required to handle the encrypted data, initiates a handshake protocol, if it is determined that a handshake protocol is required, and transmits the encrypted data after the handshake protocol has been executed.

According to another embodiment of the invention, a method is provided that initiates a handshake protocol and determines if data to be transmitted is encrypted. If it is determined that the data is encrypted, the method initiates a secure protocol and transmits the encrypted data.

According to another embodiment of the invention, a system is provided that includes a first client application, a server application, and a translation component. The first client application is configured to transmit and receive communications via a network. The server application configured to receive queries from at least one client application via the network and to transmit responses to at least one client application via the network. The translation component is configured to receive communications from the first client application and translate the received communications into queries that are understandable to the server application.

Figure 1:
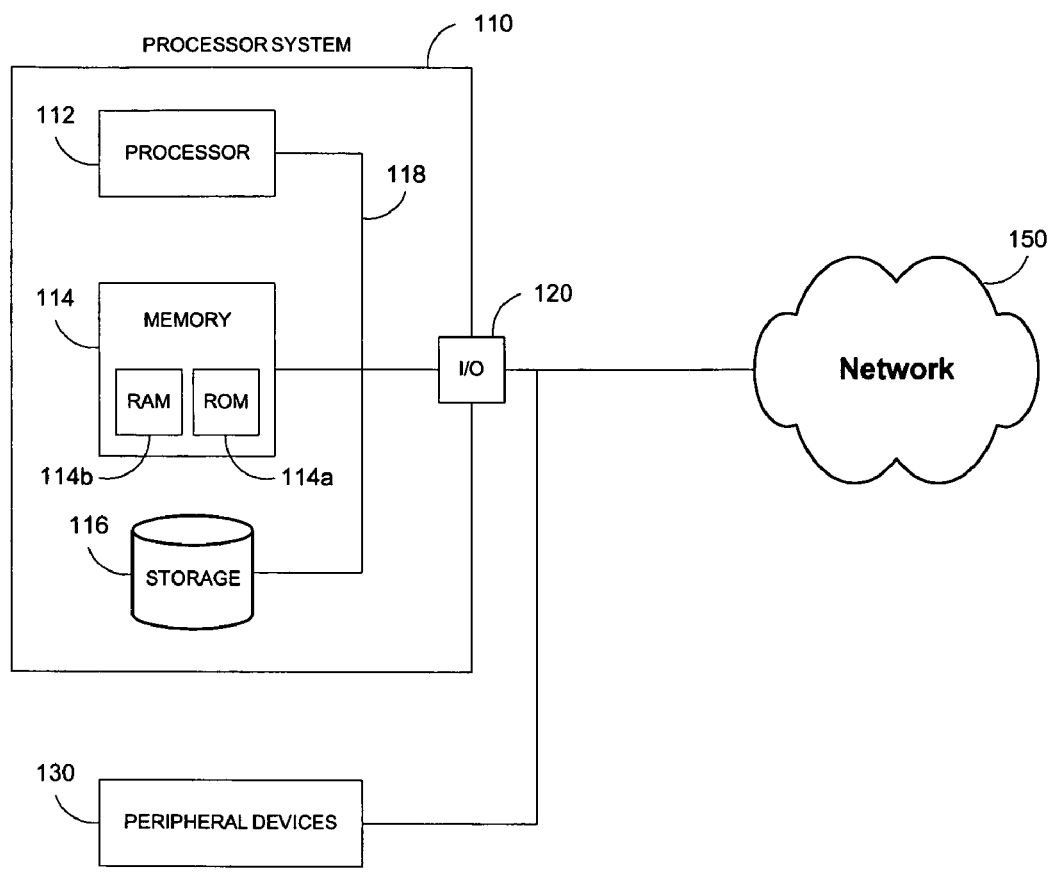
FIG. 1 is a block diagram of a system, according to an embodiment of the invention.

FIG. 1 is a block diagram of a system 100, according to an embodiment of the invention. System 100 shown in FIG. 1 includes a processor system 110 connected to a network 150. The processor system 110 can be, for example, a commercially available personal computer or a less complex computing or processing device that is dedicated to performing one or more specific tasks. For example, the processor system 110 can be a dedicated network communication terminal, client, or server.

The processor system 110 includes a processor 112, which according to one or more embodiments of the invention, can be a commercially available microprocessor, such as the 80×86 series of microprocessors available from Intel Corp., the Power PC series of microprocessors available from Motorola, Inc., the AMD series of microprocessors available from Advanced Micro Devices, Inc., or other similar microprocessors. Alternatively, the processor 112 can be an application-specific integrated circuit (ASIC), which is designed to achieve one or more specific functions, or enable one or more specific devices or applications. For example, the processor can be an ASIC designed to process network communication requests (e.g., structured data queries, etc.), decrypt or encrypt communications, and so forth.

Alternatively, the processor 112 can optionally include one or more individual sub-processors or coprocessors. For example, the processor can include a graphics coprocessor that is capable of rendering graphics, an encryption/decryption coprocessor, a database query processor, a controller that is capable of controlling one or more external or peripheral devices, a sensor that is capable of receiving sensory input from one or more sensing devices, and so forth.

The processor system 110 can also include a memory component 114. As shown in FIG. 1, the memory component 114 can include one or more types of memory. For example, the memory component 114 can include a read only memory (ROM) component 114a and a random access memory (RAM) component 114b. The memory component 114 can also include other types of memory not illustrated in FIG. 1 that are suitable for storing data in a form retrievable by the processor 112, or by other devices (e.g., devices connected to the processor system via the network 150). For example, electronically programmable read only memory (EPROM), erasable electrically programmable read only memory (EEPROM), flash memory, as well as other suitable forms of memory can be included within the memory component 114.

The processor system 110 can also include a storage component 116, which is configured to store data in one or more predetermined formats. According to one or more embodiments of the invention, the storage component 116 can be a longer-term storage device than the memory component 114. For example, according to one or more embodiments of the invention, the storage component 116 can be a database configured to store data in one or more formats, such as a SQL format, a Database 2 (DB2) format, an Extensible Markup Language (XML) format, an Oracle database format (e.g., Oracle 8i, Oracle 9i, Oracle 11i, etc.), or other desired database formats. Additionally, the storage component 116 can include one or more standard storage components, such as a disk drive, a compact (CD) drive, a digital video disk (DVD) drive, a flash memory drive, or the like.

The various components of the processor system 110 communicate via a bus 118, which is connected to each of the components of the processor system 110, and allows data to be transferred between the various components. The bus 118 can use any data transfer protocol suitable for communicating data between the various components of the processor system 110. The protocol used by the bus 118 can include any suitable bus protocol, such as Peripheral Component Interconnect (PCI), Industrial Standard Architecture (ISA), Extended ISA (EISA), Accelerated Graphics Port (AGP), Micro Channel, VESA Local Bus (VL-bus), NuBus, TURBOchannel, VersaModule Eurocard Bus (VMEbus), MULTIBUS, Subscriber Trunk Dialing (STD) bus, and other suitable bus protocols. For example, by way of the bus 118, the processor 112 communicates with the memory component 114 and the storage component 116, and can store data in or retrieve data previously stored in the memory component 114 or storage component 116.

Additionally, components of the processor system 110 can communicate with devices that are external to the processor system 110 by way of an input/output (I/O) component 120, which is also connected to the bus 118. According to one or more embodiments of the invention, the I/O component 120 can include a variety of suitable communication interfaces.

For example, the I/O component 120 can include wired connections, such as standard serial ports, parallel ports, universal serial bus (USB) ports, S-video ports, large area network (LAN) ports, small computer system interface (SCSI) ports, and so forth. Additionally, the I/O component 120 can include, for example, wireless connections, such as infrared ports, optical ports, Bluetooth wireless ports, wireless LAN ports, wireless fidelity (Wi-Fi) wireless ports, ultra-wide band (UWB) wireless ports, or the like.

By way of the I/O component 120 the processor system 110 can communicate with other local devices, such as peripheral devices 130, which can include any of a number of devices desirable to be accessed by or used in conjunction with the processor system 110. For example, the peripheral devices 130 with which the processor system 110 can communicate via the I/O component 120, can include a processor, a memory component, a storage component, a printer, a scanner, a storage component (e.g., an external disk drive, database, etc.), or any other device that a user desires to connect to the processor system 110.

The processor system 110 can also be connected to a network 150 via the I/O component 120. The network 150 can include one or more of a variety of communications networks. For example, according to one or more embodiments of the invention, the network can include the Internet. Additionally, or alternatively, the network 150 can include a variety of other communications networks, including, for example, a LAN, a wide area network (WAN), a virtual LAN (VLAN), or other suitable network.

It should be understood that the processor system 110 can also include a variety of other components not shown in FIG. 1, depending upon the desired functionality of the processor system 110. Additionally, it should be understood that more than one processor system 110 having similar or different configurations can be connected to the network 150. Thus, multiple processor systems 110 can be in communication with one another via the network 150, or with peripheral devices 130 connected to one or more of the multiple processor systems 110, via the network 150.

Figure 1A:
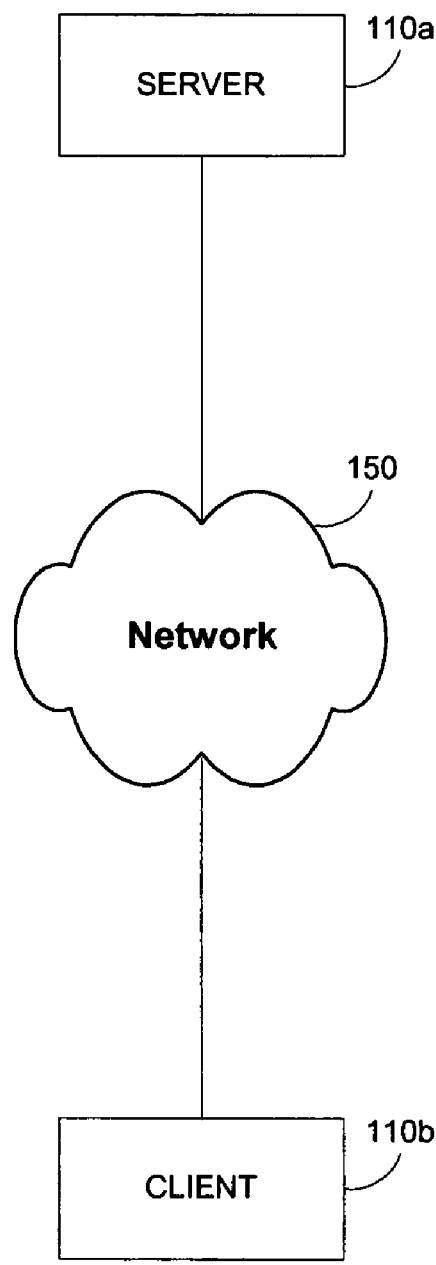
FIG. 1A is a block diagram of a system, according to an embodiment of the invention.

FIG. 1A is a block diagram of a system 100a, according to an embodiment of the invention, which has at least two processor systems 110a, 110b in communication via the network 150. More specifically, according to one or more embodiments, at least one processor system 110 is a server processor system 110a (referred to herein as a server), and is generally responsible for servicing requests received via the network 150. For example, the server 110a can service structured requests, such as SQL requests, or the like. According to one or more embodiments of the invention, the server 110a can be configured to use named pipes in processing structured requests received via the network 150. For example, according to one or more specific embodiments of the invention, the server 110a can be an MS SQL Server. Although only one server 110a is shown in FIG. 1A, multiple servers 110a can be connected to the network 150, and used in the system 100a.

Additionally, according to one or more embodiments, at least one processor system 110 is a client processor system 110b (referred to herein as a client). The client, for example, can provide requests, such as structured requests (e.g., SQL requests, etc.) to the server 110b and receive responses to those requests via the network 150. According to one or more embodiments of the invention, the client 110b is configured to interpret secure communications (e.g., communications using SSL, etc.), and can use, for example, a standard library (e.g., a standard SSL library). For example, according to one or more specific embodiments of the invention, the client 110b can be a Java client that is configured to use sockets, such as the Java Secure Socket Extension (JSSE) available from Sun Microsystems, Inc. According to one or more embodiments, for example, the client 110b can be configured to use the Sun Java Desktop System and the Sun Java Enterprise System available from Sun Microsystems, Inc. More specifically, the client 110b can be configured to use the Java Database Connectivity (JDBC) Type 4 driver, or other comparable driver. Although only one client 110b is shown in FIG. 1A, multiple clients 110b can be connected to the network 150, and used in the system 100a. Additionally, one or more processor systems 110 including functionality of both a server 110a and a client 110b can be included in the system 100a, and can communicate via the network 150.

Figure 2:
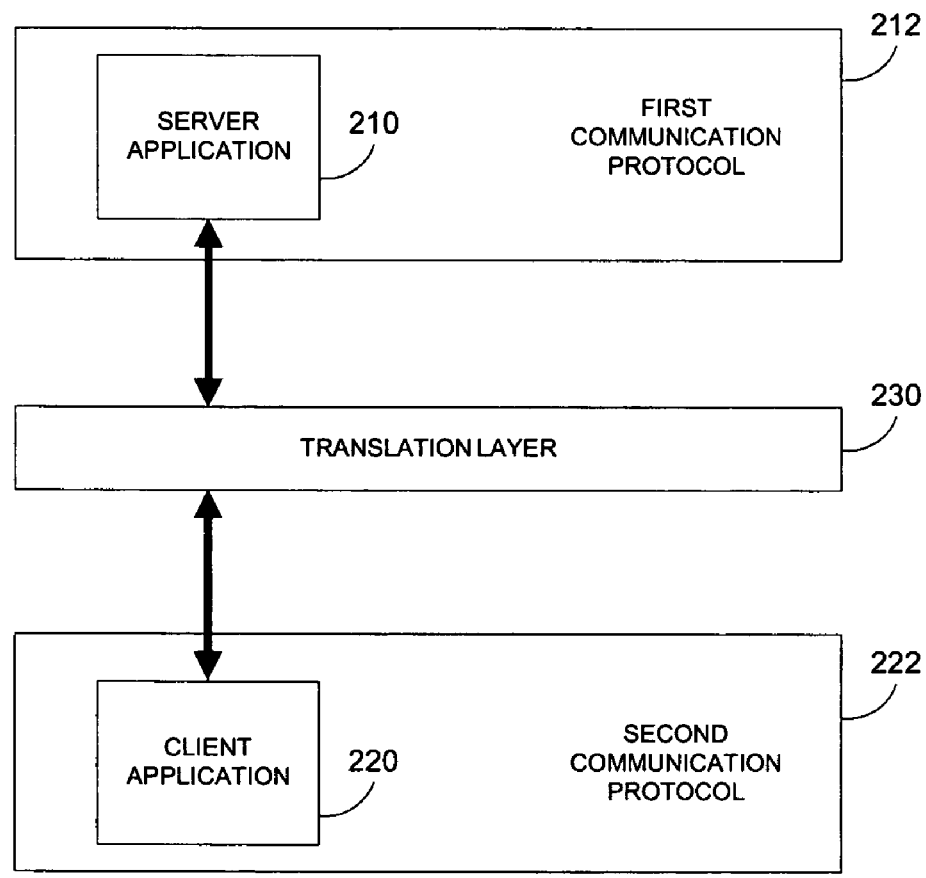
FIG. 2 is a block diagram illustrating communication between two protocols, according to an embodiment of the invention.

FIG. 2 is a block diagram illustrating communication between multiple protocols, according to an embodiment of the invention. In FIG. 2, a system 200 is shown in which a server application 210 using a first communication protocol 212 is attempting to communicate with a client application 220 using a second communication protocol 222. According to one or more embodiments of the invention, the two communication protocols 212, 222 are not compatible, such as for secure communications (e.g., SSL communications). The server application 210 can reside on a server 110a, which can be one of multiple processor systems 110 connected to the network 150, as mentioned above. Additionally, the client application 220 can reside on a client 110b, which can be one of multiple processor systems 110 connected to the network 150, as mentioned above. The server application 210 and the client application 220 can attempt to communicate with one another via the network 150 (shown in FIGS. 1 and 1A).

The server application 210 can be an MS SQL Server application, and the client application 220 can be a Java client configured to use a standard SSL library (e.g., JSSE), such as a client using a JDBC Type 4 driver. For the sake of convenience, one or more embodiments of the invention will be described in connection with these specific devices. It should be recognized, however, that the principles of the invention can be applied to other devices and situations requiring similar translation between protocols (e.g., between a protocol using named pipes or a proprietary handshake protocol and a protocol that requires sockets, etc.).

When a server 110a, such as the MS SQL Server, running a server application 210 using a first communication protocol 212, such as the MS SQL Server protocol attempts to communicate via the network 150 using SSL with the client application 220 of a client 110b, such as the JDBC type 4 driver, which is running a second communication protocol 222, there are specific difficulties associated with communicating between the two protocols 212, 222. For example, as mentioned above, a server 110a, such as the MS SQL Server, uses the same communication channel for both unencrypted communications and encrypted, SSL communications (i.e., TCP/IP port 80), and decrypts SSL communications during its proprietary handshake protocol. A client 110b using a standard SSL library, such as the JSSE, however, typically uses a separate channel for unencrypted communications (e.g., HTTP via port 80) than it uses for encrypted, SSL communications (e.g., HTTPS via port 443). Because the standard SSL library is generalized and intended to be used with multiple systems, it is not able to handle the proprietary handshake protocol of the MS SQL Server.

Additionally, because the proprietary handshake protocol of the MS SQL Server uses named pipes and the JSSE does not support named pipes over the socket API, but instead requires a socket to communicate, one or more embodiments of the invention provide the capability of translating between the two separate protocols 212, 222 of the client and the server. This is accomplished, according to one or more embodiments of the invention, by adding at least one translation layer 230 between the two protocols. For example, a translation layer 230 can be used by a client using the standard SSL library (e.g., JSSE) to allow it to support named pipes. Additionally, or alternatively, a translation layer 230 can be used by a client using the SSL library (e.g., JSSE) to provide compatibility with the handshake protocol of the server (e.g., the MS SQL Server protocol).

To facilitate an understanding of the invention, some existing structures and techniques associated with one or more embodiments of the invention and/or associated with SSL communications or a JSSE client will be described. The description of these existing structures and techniques is intended to aid understanding of how they interact with various aspects of the invention. It should be recognized that, although structures and techniques include reference to specific versions and/or releases (e.g., SSL Version 3.0, MS SQL Server 2000, JDBC Type 4, etc.), other structures and techniques according to other versions and/or releases can be used with one or more embodiments of the invention by adapting the principles described herein to those other versions and/or releases.

SSL Packets

Tables 1-4 below show the basic structure of SSL packets according to SSL Version 3.0. SSL packets (e.g., SSL Version 3.0 packets) have a specific header structure, which is shown in detail in Table 1 below.

TABLE 1

| Size | Name | Description/Values |
| --- | --- | --- |
| 1 byte | Packet Type | Values are 20, 21, 22, 23 (See Table 2 below) |
| 1 byte | SSL Major Version | Valid values are 3 or 2 On the MS SQL Server 2000 the value is always 3 |
| 1 byte | SSL Minor Version | On the MS SQL Server 2000 the value is always 0 |
| 2 bytes | Packet Size | The byte order is Lo, Hi (i.e., little endian) |

Some SSL packet types that can be used, according to SSL Version 3.0, in the "Packet Type" portion of the SSL packet structure (shown above in Table 1) are shown below in Table 2. It will be noted that other packet types, according to other protocols (e.g., later versions of the SSL protocol) could be included in such a table and used according to one or more embodiments of the invention. In Table 2, four packet types are shown and the function of each packet associated with the defined type ID is shown. For example, a "Change Cipher Specs." packet type signals a change in cipher specifications (e.g., a change in the encryption key, etc.). The "Alert" packet type is used to indicate SSL packets associated with an alert. The "Handshake" packet type is used to identify SSL packets associated with an SSL handshake, which is described in greater detail below.

TABLE 2

| Packet Type ID | Packet Types |
| --- | --- |
| 20 | Change Cipher Specs. |
| 21 | Alert |
| 22 | Handshake |
| 23 | Data |

SSL handshake packets (i.e., the Packet Type is "Handshake") have the form shown below in Table 3, which shows the SSL Version 3.0 handshake packet structure.

TABLE 3

| Size | Packet Name | Description/Values |
| --- | --- | --- |
| 1 byte | Packet Type | Always 22 for a handshake |
| 1 byte | SSL Major Version | Always 3 for Version 3.0 |
| 1 byte | SSL Minor Version | Always 0 on SQL Server 2000 |
| 2 bytes | Packet Size | The byte order is Lo, Hi |
| 1 byte | Message Type | (See Table 4 below) |
| 3 bytes | Message Length | Defines length (in bytes) of message data |

The types of messages (i.e., the "Message Type" values listed on the fifth row of Table 3 above) will have the form shown below in Table 4 below, which shows the SSL Version 3.0 handshake packet message types. The message types shown below in Table 4 have to do with various stages of an SSL handshake procedure.

TABLE 4

| Message Type ID | Message Types |
| --- | --- |
| 0 | Hello Request |
| 1 | Client Hello |
| 2 | Server Hello |
| 11 | Certificate |
| 12 | Key Exchange |
| 13 | Certificate Request |
| 14 | Server Hello Down |
| 15 | Certificate verify |
| 16 | Client Key Exchange |
| 20 | Finished |

SQL Server Packets

Tables 5-7 below outline the basic structures and types of SQL server packets. The basic structure of Tabular Data Stream (TDS) packets, which are used in communicating with some servers 110a, such as SQL servers (e.g., MS SQL Server, Sybase Server, etc.) is shown below in Table 5. In Table 5, the entries in the first 4 rows correspond to TDS packet header information and the last entry corresponds to packet data. The first entry contains the packet type, the second entry contains an indication of whether or not it is the last packet, the third entry contains an indication of the packet size, and the last entry corresponds to the data, which can vary in size. The fourth entry is reserved for multiple parallel requests, and is currently unused.

TABLE 5

| Size | Description/Values |
| --- | --- |
| 1 byte | Packet Type |
| 1 byte | Is last packet |
| 2 bytes | Packet Size |
| 4 bytes | Unused |
| (Var.) | Data |

Two types of TDS packets (i.e., the "Packet Type" designations from Table 5 above), used according to one or more embodiments of the invention, are shown below in Table 6. In Table 6, the two TDS packet types shown are: "Server Response" and "Handshake."

TABLE 6

| Packet Type ID | Description/Values |
|---|---|
| 4 | Server Response |
| 18 | Handshake |

Table 7 below shows selected data of a Feature Request Packet used by the MS SQL Server (e.g., the MS SQL Server 2000), which are used according one or more embodiments of the invention. The Feature Request Packet is a Handshake TDS Packet (i.e., a TDS Packet of type 18).

TABLE 7

| Size | Description/Values |
|---|---|
| 2 bytes | 0x00, 0x00 because it is not an SSL packet |
| 12 bytes | 0x15, 0x00, 0x06, 0x01, 0x00, 0x1B, 0x00, 0x01, 0x02, 0x00, 0x1C, 0x00 |
| 1 byte | Instance name length + 1 for null termination |
| 2 bytes | 0x03, 0x00 |
| 1 byte | Structure Size, typical Instance Name size + 29 |
| 3 bytes | 0x00, 0x04, 0xFF |
| 1 byte | SQL Server major version (e.g., Version 8) |
| 1 byte | SQL Server minor version (e.g., 0) |
| 2 bytes | SQL Server micro version, different values (e.g., 100) |
| 2 bytes | 0x00, 0x00 |
| 1 byte | Flag, Bit 0: SSL support |
| 1+ bytes | Instance name + null termination |
| 4 bytes | 0x00, 0x00, 0x00, 0x00 |

Although Table 7 above corresponds to data of a Feature Request Packet, a Feature Response Packet has a similar, corresponding structure. In the Feature Request Packet, the "Structure Size" includes an "Instance Name," which is usually empty, and 29 bytes of data (i.e., the first 29 bytes of data are included in the response, and data after position 29 are not). Additionally, the "SSL Support" flag is on (i.e., set to a value of 0), which causes the MS SQL Server to support SSL communications.

Standard Server Handshake

Figure 3:
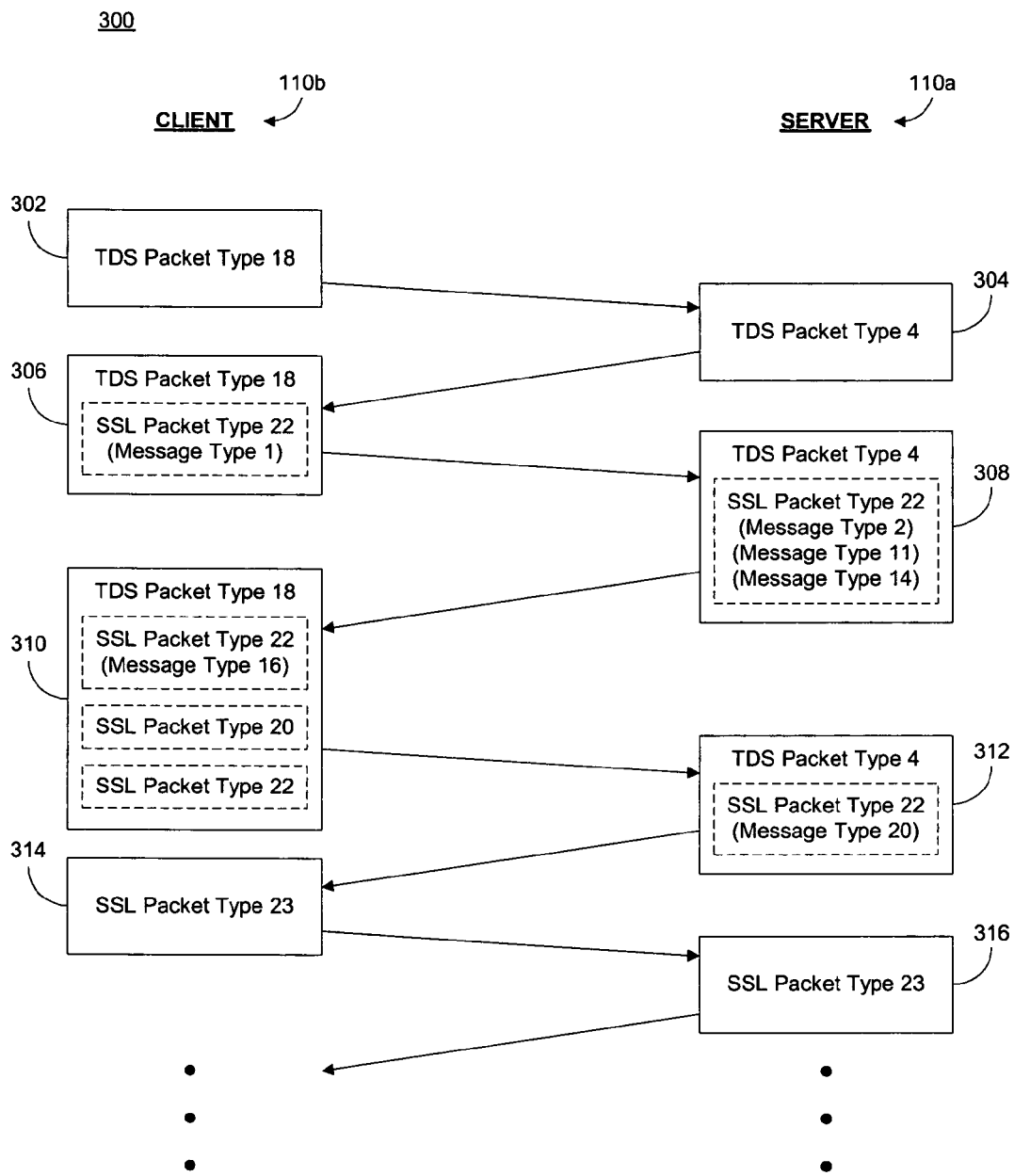
FIG. 3 is a diagram of the steps of a standard handshake between a client and an MS SQL server.

Table 8 below outlines the basic steps of the handshake protocol between a client 110*b* and an MS SQL Server (e.g., the MS SQL Server 2000). The steps outlined in Table 8 could be, for example, used by a client 110*b* using an Open Database Connectivity (ODBC) driver available from Microsoft Corp. The basic steps of the protocol 300 are shown graphically in FIG. 3, wherein the packets processed by the server 110*a* are shown at the right and packets processed by the client 110*b* are shown at the left. The protocol proceeds from the beginning (shown at the top of FIG. 3 and Table 8) to the end (shown at the bottom of FIG. 3 and Table 8) as packets are transferred between a client 110*b* and a server 110*a* in the directions shown by the arrows in FIG. 3 and in the center column of Table 8. More specifically, data transferred to the server 110*a* from the client 110*b* are represented by (an) arrow(s) pointing to the right and data transferred to the client 110*b* from the server 110*a* are represented by (an) arrow(s) pointing to the left. The handshake protocol can continue, until a predetermined number of SSL data packets have been transferred between the server 110*a* and the client 110*b*, or until the connection is broken.

TABLE 8

| Step | Client | Dir. | Server |
|---|---|---|---|
| 302 | TDS Packet of type 18 (Handshake) with the Feature Request Packet | → | |
| 304 | | ← | TDS Packet of Type 4 (Server Response) with the Feature Response Packet |
| 306 | TDS Packet of type 18 (Handshake) The data of the TDS packet include an SSL Packet of type 22 (Handshake) with a Message Type 1 (Client Hello) | → | |
| 308 | | ← | TDS Packet of type 4 (Server Response) The data of the packet include an SSL packet of type 22 (Handshake) with the Message Types: 2 (Server Hello) 11 (Certificate) 14 (Server Hello Down) |
| 310 | TDS Packet of type 18 (Handshake) The data of the TDS packet include multiple SSL Packets: SSL packet of type 22 (Handshake) with Message Type 16 (Client Key Exchange) SSL Packet Type 20 (Change Cipher Specs.) SSL Packet Type 22 (Handshake) | → | |
| 312 | | ← | TDS Packet of type 4 (Server Response) The data of the packet include an SSL Packet of type 22 (Handshake) with the Message Type 20 (Finished) |

TABLE 8-continued

| Step | Client | Dir. | Server |
|------|--------|------|--------|
| 314 | SSL packet of type 23 (Data) | → | |
| 316 | | ← | SSL packet of type 23 (Data) |
| . . | | . . | |
| . . | | . . | |
| . . | | . . | |

Java Class Structure

Figure 4:
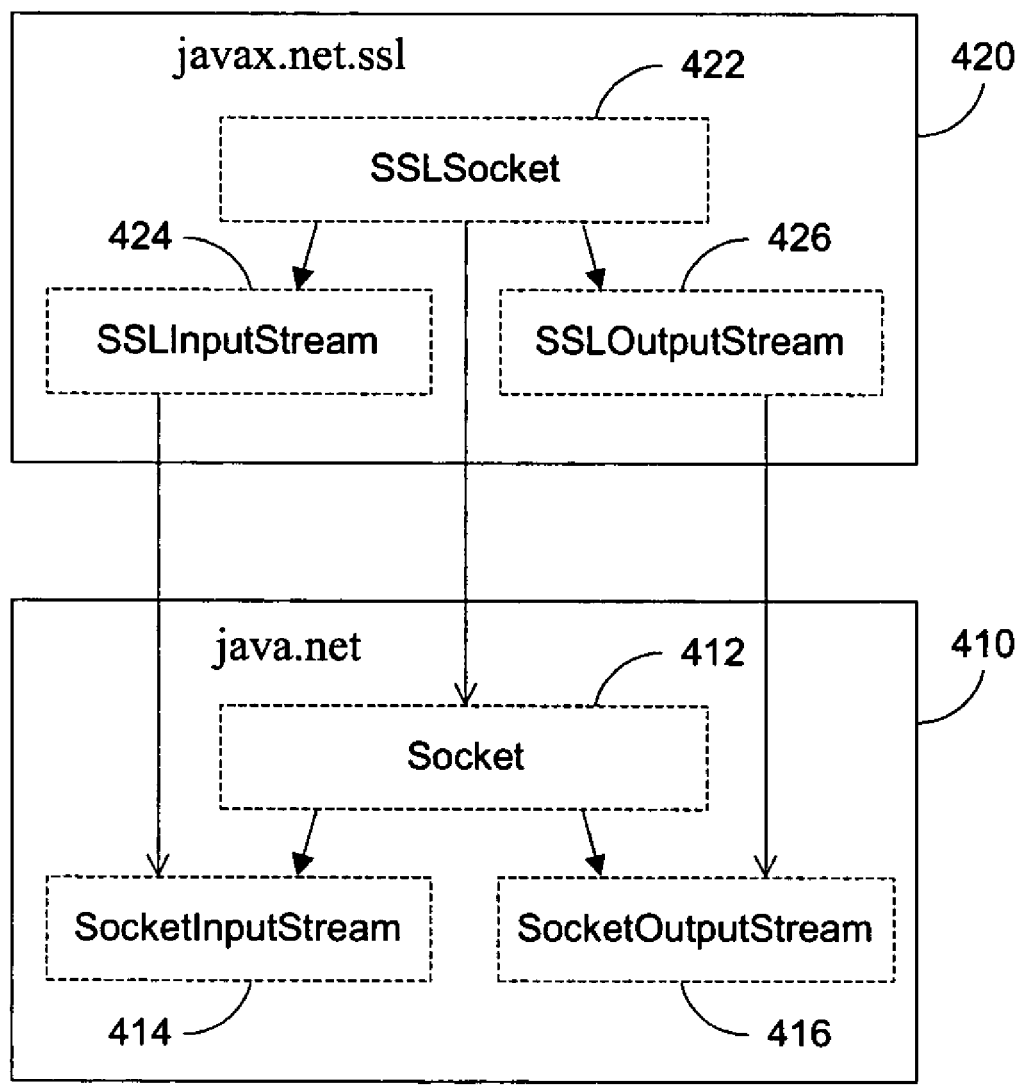
FIG. 4 is a diagram showing Java class instances used by a client, according to an embodiment of the invention.

FIG. 4 is a diagram showing Java class instances used by a client 110b, according to an embodiment of the invention. Specifically, the Java class instances shown in FIG. 4 are obtained by applying the Java code shown below within a JSSE.

Socket socket=SSLSocketFactory.getDefault( ).create
   Socket(host, port)

In FIG. 4, a structure 400 is shown that includes two packages: java.net 410 and javax.net.ssl 420, which are created by the above Java code when SSL communications are to be executed using a JSSE client. The first package java.net 410 is also referred to as the base, and relates to the underlying Socket 412 (the base socket) that is used for secure communications (e.g., using SSL). The Socket 412 maintains communications using whatever communications protocol is being used (e.g., TCP/IP, etc.). The SocketInputStream object 414 and the SocketOutputStream object 416 represent all communications to and from the Socket 412, respectively.

The second package Javax.net.ssl 420 shown in FIG. 4 contains an SSLSocket 422, which is a secure socket used for secure (e.g., SSL) communications. The SSLInputStream object 424 represents a decoder configured to decode incoming data, and the SSLOutputStream object 426 represents an encoder configured to encode outgoing data.

The SSLSocket 420 uses the base Socket 412 to transmit and receive encrypted data, as shown by the arrow between the SSLSocket 420 and the Socket 412. More specifically, any application programming interface (API) calls to the SSLSocket 420 are forwarded to the base Socket 412 for handling. Similarly, an API call to the SSLInputStream object 424 (e.g., to receive incoming SSL communications) allows encrypted data received via the SocketInputStream object 414 to be decoded. An API call to the SSLOutputStream object 426 (e.g., to write outgoing SSL data) causes data encrypted by the SSLOutputStream object 426 to be output via the SocketOutputStream object 416.

Translation Layer

As mentioned above, because some servers (e.g., the MS SQL Server) do not use separate sockets for secure (e.g., SSL) and non-secure (e.g., non-SSL) communications, the Java class instances shown in FIG. 4 are difficult to use with such systems. Thus, according to one or more embodiments of the invention, at least one translation layer 230 is used to translate communications using standard SSL libraries (e.g., the JSSE client's Java class instances shown in FIG. 4) to communicate with servers that do not use separate sockets, but which use a handshake protocol to establish secure communications, and/or which use named pipes.

Figure 5:
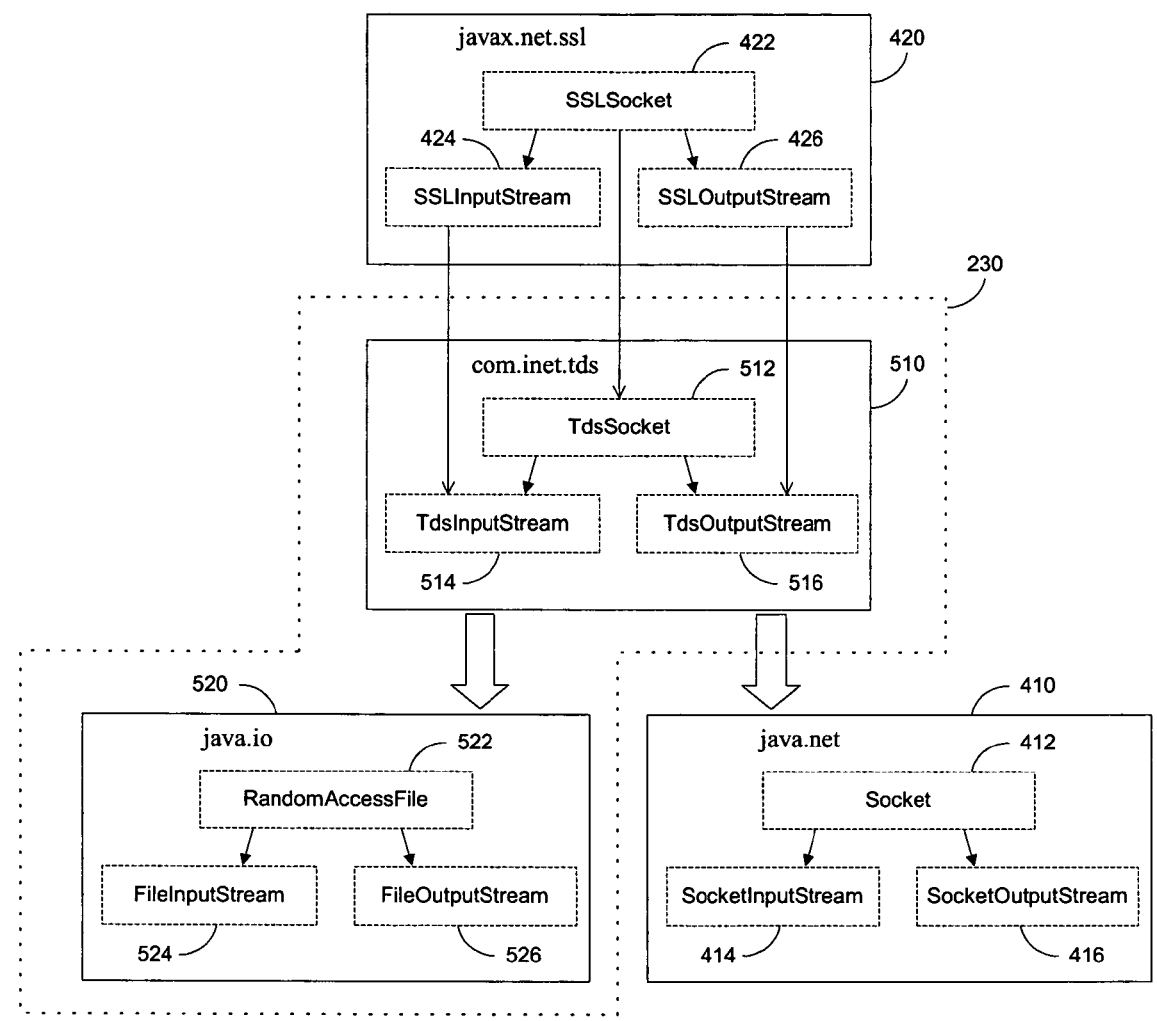
FIG. 5 is a diagram showing Java class instances and a translation layer, according to an embodiment of the invention.

FIG. 5 is a diagram showing Java class instances and a translation layer 230, according to an embodiment of the invention. The structure 500 shown in FIG. 5 contains the same packages java.net 410 and javax.net.ssl 420 shown in FIG. 4. Additionally, the structure 500 shown in FIG. 5 has a translation layer 230 that includes com.inet.tds 510 and java.io 520. This translation layer 230 is between the SSLSocket 422 and the underlying Socket 412 and services communications to and from servers (e.g., MS SQL Server 2000) that do not support secure and non-secure communications using separate ports. The following Java Code is used to create the structure 500 shown in FIG. 5.

TdsSocket tdsSocket=new TdsSocket( Properties
   props ); Socket
   socket=SSLSocketFactory.getDefault( ).create
   Socket( tdsSocket, host, port, true);

The com.inet.tds package 510 in FIG. 5 includes a new socket class TdsSocket 512, which is configured to package a simple socket request, or an access request for a file. Thus, using the TdsSocket 512, communication via both sockets and communication using named pipes can be accomplished, allowing the structure 500 to facilitate communications between devices using the standard SSL protocol as well as devices using non-standard SSL protocol (e.g., MS SQL Server). Specifically, secure communications (e.g., SSL communications) that are to be communicated via the SSLSocket 422 are packaged by the TdsSocket 512 according to the type of system to which they are being communicated. For example, if a standard secure communication protocol (e.g., SSL, etc.), which uses a separate port for secure communications, is to be used, the API calls to the SSLSocket 422 will call the TdsSocket 512, which in turn will call the base Socket 412. If, on the other hand, a device using a non-standard security protocol, such as a system using named pipes (e.g., MS SQL Server), is to be used, the API calls to the SSLSocket 422 will call the TdsSocket 512, which in turn will package the call in a RandomAccessFile object 522 that can be used by the server.

The com.inet.tds package 510 in FIG. 5 also includes two logical objects: TdsInputStream 514 and TdsOutputStream 516, which are configured to handle the processing associated with socket communications or an additional server handshake protocol (e.g., using TDS packets). API calls to the TdsInputStream object 514, for example, call either the SocketInputStream object 414 for standard SSL socket communications, or the FileInputStream object 524 for communications using named pipes. Likewise, API calls to the TdsOutputStream object 516 call either the SocketOutputStream object 416 for standard SSL socket communications, or the FileOutputStream object 526 for communications using named pipes. The TdsInputStream object 514 and the TdsOutputStream object 516 include logic that allows them to select between named pipe communications and socket communications, and to access the proper file or socket, depending upon the communications protocol used.

Thus, by using the translation layer 230 shown in the structure 500 of FIG. 5, a client 110b using a standard encryption library (e.g., a standard SSL library such as JSSE) can use named pipes in addition to sockets to communicate with a server 110a. Therefore, the handshake protocol of some servers (e.g., the MS SQL Server), in which the security handshake protocol (e.g., the SSL handshake protocol) is packaged, can be translated via the translation layer 230 shown in FIG. 5 to allow communication between those servers and standard security or SSL clients (e.g., the JSSE client) that normally would not be able to communicate with such servers.

Figure 6:
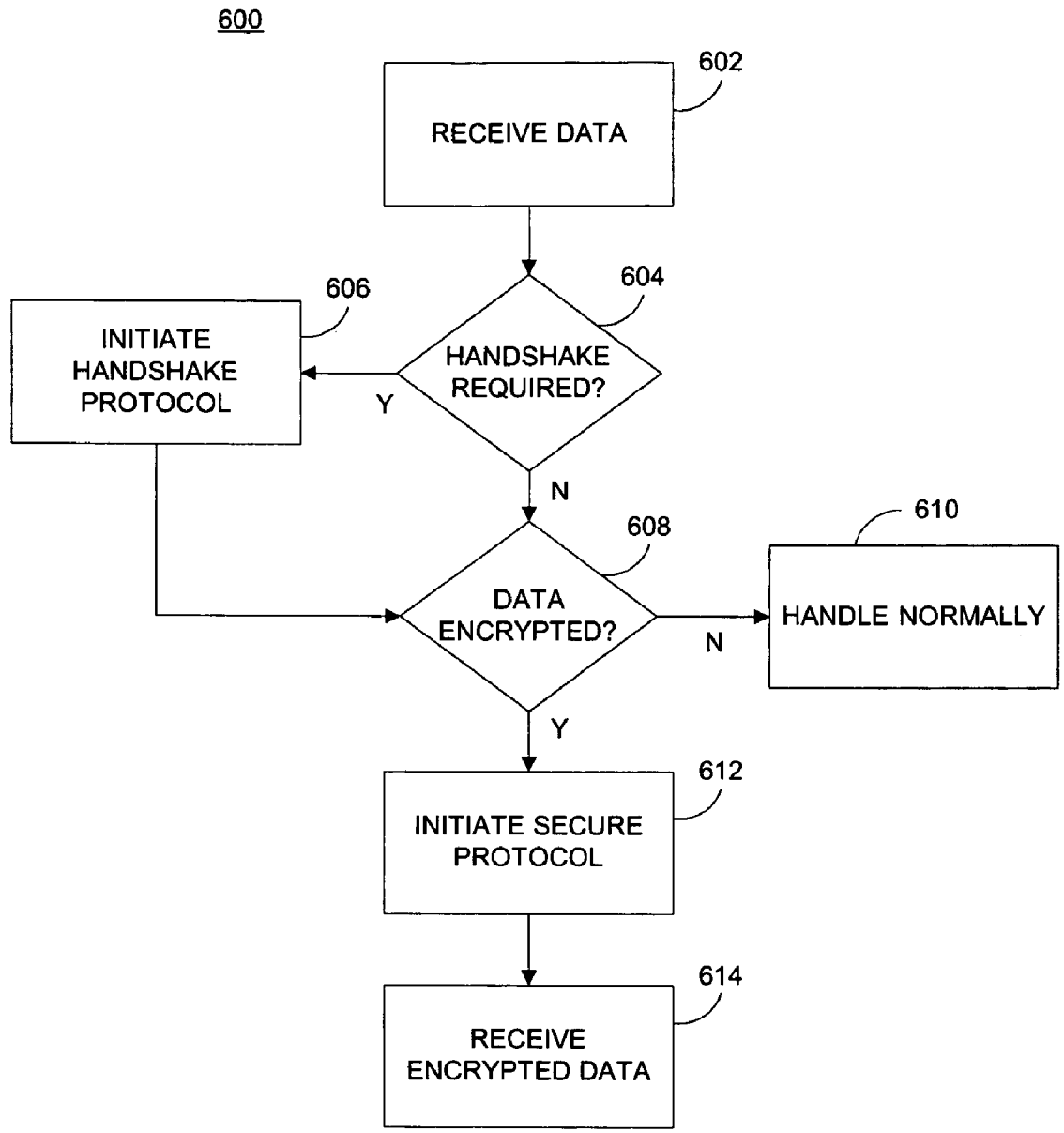
FIG. 6 is a flow diagram showing steps associated with handling received data, according to an embodiment of the invention.

FIG. 6 is a flow diagram showing steps associated with handling received data, according to an embodiment of the invention. The technique 600 for receiving data begins as data is received by a client 110b in step 602. A determination is made in step 604 by the TdsInputStream object 514 regarding whether or not a handshake protocol (e.g., the TDS protocol of the MS SQL Server) is required. If a handshake protocol is determined in step 604 to be required, then the handshake protocol is initiated in step 606. If a handshake protocol is determined in step 604 not to be required, or after the handshake protocol is initiated in step 606, a determination is made in step 608 regarding whether or not the received data is encrypted. If the data is not encrypted, then the received data is handled normally in step 610. If the data is encrypted, then a secure protocol (e.g., an SSL protocol) is initiated in step 612 by the TdsInputStream object 514. The secure protocol initiated in step 612 can be initiated by the TdsInputStream object 514 within a handshake protocol initiated in step 606 (e.g., using named pipes), or outside of any server handshake protocol (e.g., using standard SSL socket communications), as determined by the logic of the TdsInputStream object 514. The secure protocol initiated in step 612 can include a security handshake procedure, such as an SSL handshake, for example. Once the secure protocol initiated in step 612, the encrypted data is received and decrypted in step 614.

Figure 7:
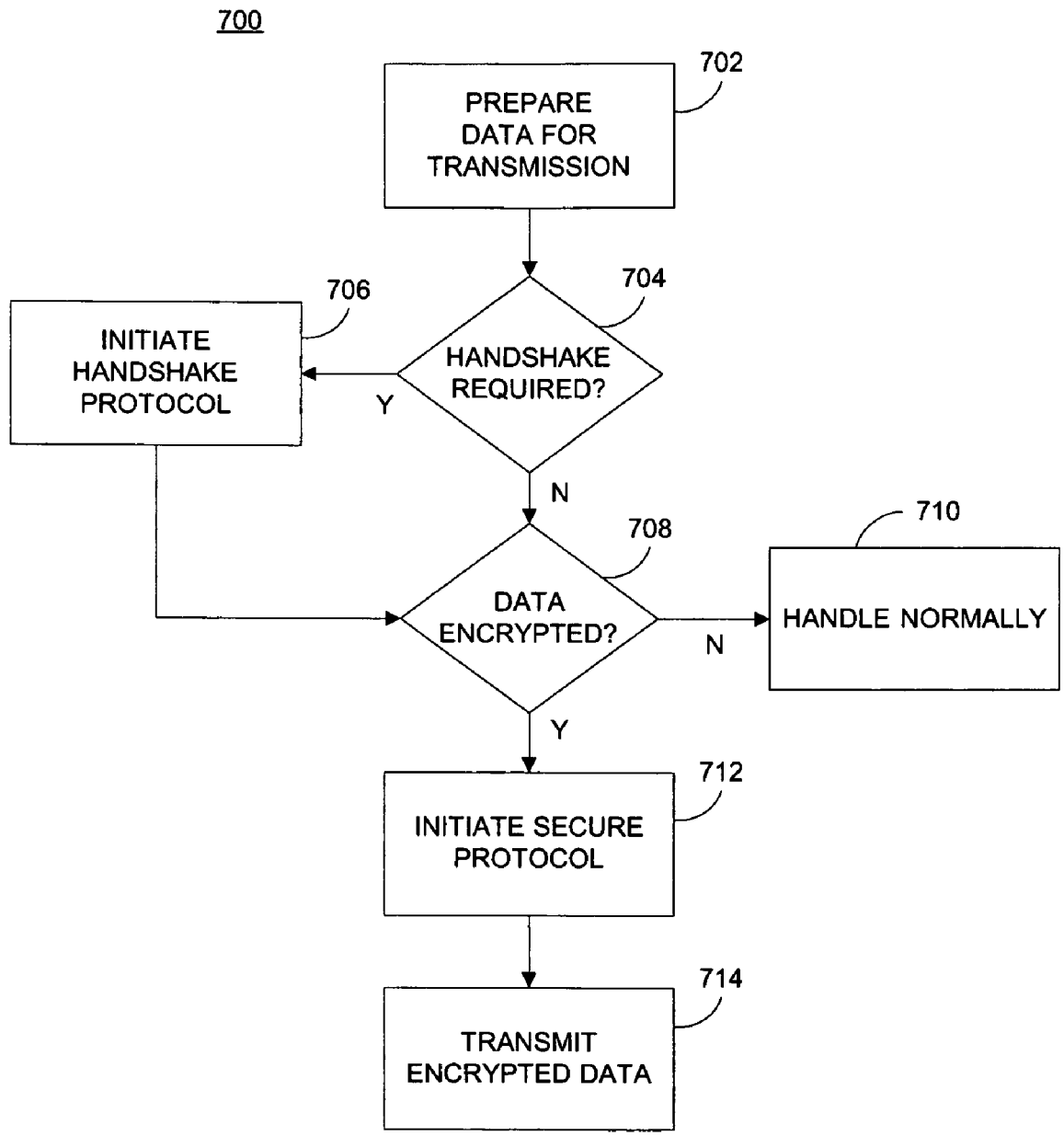
FIG. 7 is a flow diagram showing steps associated with handling data to be transmitted, according to an embodiment of the invention.

FIG. 7 is a flow diagram showing steps associated with handling data to be transmitted, according to an embodiment of the invention. The technique 700 for receiving data begins as data is prepared for transmission to a server 110a in step 702. A determination is made by the TdsOutputStream object 516 in step 704 regarding whether or not a handshake protocol (e.g., a TDS handshake protocol for a MS SQL Server) is required. If it is determined in step 704 that a handshake protocol is required, then the required handshake protocol is initiated in step 706. If it is determined in step 704 that no handshake protocol is required, or after a handshake protocol is initiated in step 706, a determination is made by the TdsOutputStream object 516 in step 708 regarding whether or not the data to be transmitted is to be encrypted. If the data is not to be encrypted, then it is handled normally in step 710. If the data is to be encrypted, then a secure protocol (e.g., an SSL protocol) is initiated in step 712 by the TdsOutputStream object 516, which includes encrypting the data to be transmitted. The secure protocol initiated in step 712 can be initiated by the TdsOutputStream object 516 within a handshake protocol initiated in step 706 (e.g., using named pipes), or outside of any server handshake protocol (e.g., using standard SSL socket communications), as determined by the logic of the TdsOutputStream object 516. The secure protocol initiated in step 712 can also include a security handshake procedure, such as an SSL handshake, for example. Once the secure protocol initiated in step 712, the encrypted data is transmitted in step 714.

Server Handshake with Translation

Table 9 below contains steps associated with implementing the handshake protocol shown above in Table 8 according to one or more embodiments of the invention. The basic steps of the protocol 800 are shown graphically in FIG. 8, wherein the packets processed by the server 110a and functions performed by the server 110a are shown to the right and packets processed by the client 110b and functions performed by the client are shown to the left. The protocol proceeds from beginning (shown at the top of FIG. 8 and Table 9) to the end (shown at the bottom of FIG. 8 and Table 9) as packets are transferred between a client 110b and a server 110a in the directions shown by the arrows in FIG. 8 and the center column of Table 9. More specifically, data transferred to the server 110a from the client 110b are represented by (an) arrow(s) pointing to the right and data transferred to the client 110b from the server 110a are represented by (an) arrow(s) pointing to the left. The handshake protocol can continue, until a predetermined number of SSL data packets have been transferred between the server 110a and the client 110b, or until the connection is terminated

TABLE 9

| Step | Client (using translation layer 230) | Dir. | Server |
|---|---|---|---|
| 802 | TDS Packet of type 18 (Handshake) with the Feature Request Packet {TdsOutputStream} | | |
| 803 | Send the data {FileOutputStream}/ {SocketOutputStream} | → | |
| 804 | | ← | TDS Packet of Type 4 (Server Response) with the Feature Response Packet |
| 805 | Read incoming data {FileInputStream}/ {SocketInputStream} | | |
| 806 | Remove TDS packet header from incoming data {TdsInputStream} | | |
| 808 | SSL Packet of type 22 (Handshake) with a Message Type 1 (Client Hello) {SSLOutputStream} | | |
| 810 | Add TDS packet header {TdsOutputStream} TDS Packet of type 18 (Handshake) The data of the TDS packet include the SSL packet from step 808 | | |

TABLE 9-continued

| Step | Client (using translation layer 230) | Dir. | Server |
|---|---|---|---|
| 811 | Send the data {FileOutputStream}/ {SocketOutputStream} | → | |
| 812 | | ← | TDS Packet of type 4 (Server Response) The data of the packet include an SSL packet of type 22 (Handshake) with the Message Types: 2 (Server Hello) 11 (Certificate) 14 (Server Hello Down) |
| 813 | Read incoming data {FileInputStream}/ SocketInputStream} | | |
| 814 | Remove TDS packet header from incoming data {TdsInputStream} | | |
| 816 | Process received SSL packet {SSLInputStream} | | |
| 818 | Multiple SSL Packets: SSL packet of type 22 (Handshake) with Message Type 16 (Client Key Exchange) SSL Packet Type 20 (Change Cipher Specs.) SSL Packet Type 22 (Handshake) {SSLOutputStream} | | |
| 820 | Add TDS packet header {TdsOutputStream} TDS Packet of type 18 (Handshake) The data of the TDS packet include the multiple SSL packets from step 818 | | |
| 821 | Send the data {FileOutputStream}/ {SocketOutputStream} | → | |
| 822 | | ← | TDS Packet of type 4 (Server Response) The data of the packet include an SSL Packet of type 22 (Handshake) with the Message Type 20 (Finished) |
| 823 | Read incoming data {FileInputStream}/ {SocketInputStream} | | |
| 824 | Remove TDS packet header from incoming data {TdsInputStream} | | |
| 826 | Process received SSL packet {SSLInputStream} | | |
| 828 | SSL packet of type 23 (Data) {SSLOutputStream} | | |
| 830 | Prepare SSL packet from step 824 for transmission {TdsOutputStream} | | |
| 831 | Send the data {FileOutputStream}/ {SocketOutputStream} | → | |
| 832 | | ← | SSL packet of type 23 (Data) |
| . . . | | . . . | |

Figure 8:
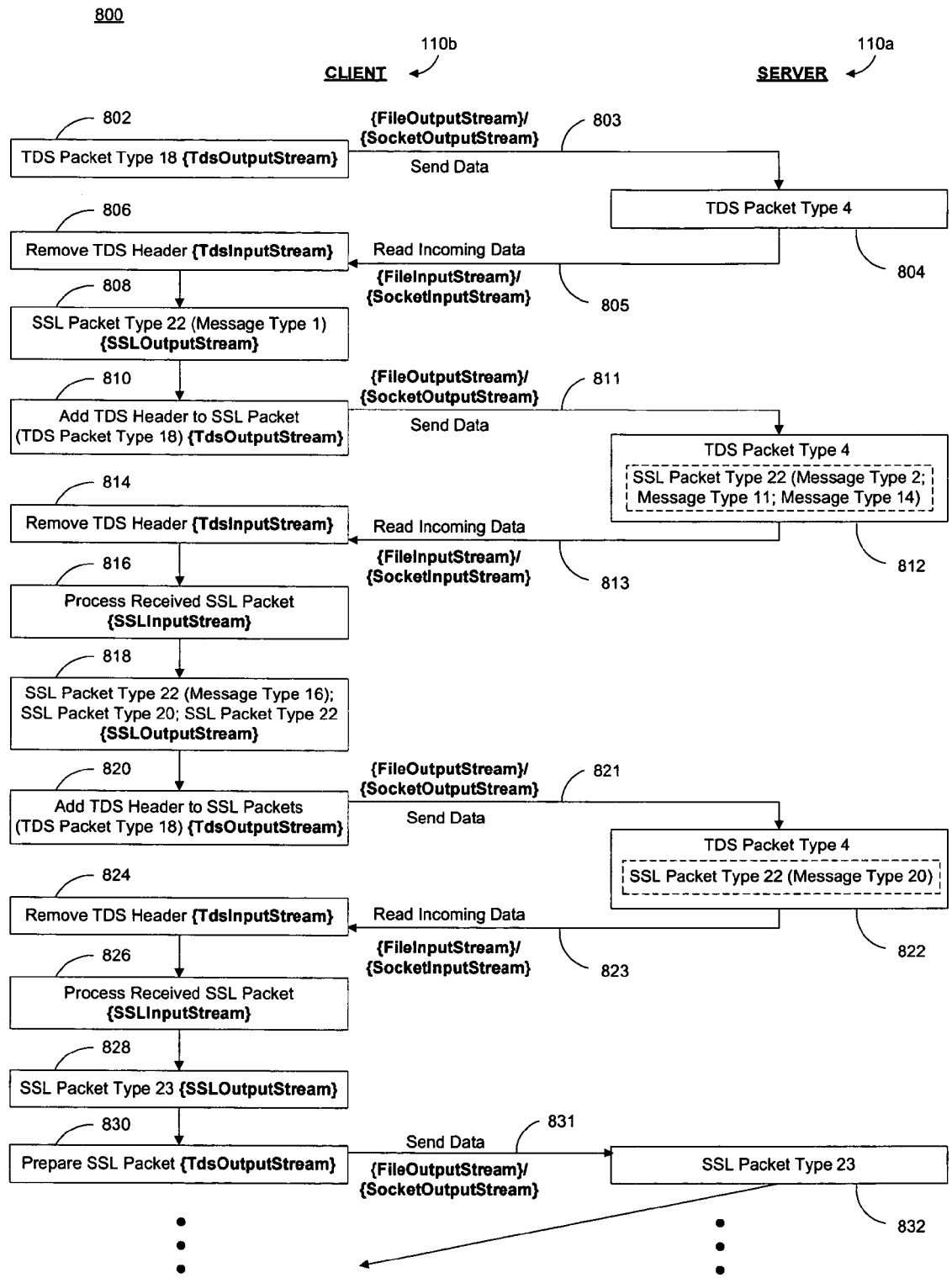
FIG. 8 is a diagram of the steps of a handshake between a client and a server, according to an embodiment of the invention.

The handshake protocol 800 shown in FIG. 8 begins as a TDS packet of type 18 (Handshake) is created by the client 110b using the TdsOutputStream object 516 in step 802. In step 803, the data (i.e., the TDS packet created in step 802) is sent from the client 110b to the server 110a using either the FileOutputStream object 526 or the SocketOutputStream object 416. In response, a TDS packet of type 4 (Server Response) is created by the server 110a in step 804, and is transmitted from the server 110a to the client 110b. The incoming data (i.e., the TDS packet created in step 804) is read in step 805 by either the FileInputStream object 524 or the SocketInputStream object 414. The TDS header is removed from the received TDS packet by the TdsInputStream object 514 in step 806. Removing the TDS packet header can be easily accomplished since the header describes the size of the included SSL data, making it easy to determine which bytes belong to the packet and the packet header.

An SSL packet of type 22 (Handshake) having a message of type 1 (Client Hello) is generated on the client 110b by the SSLOutputStream object 426 in step 808. TDS packet header information is added to the SSL packet by the TdsOutputStream object 516 and the resulting TDS packet of type 18 (Handshake) is created in step 810. Adding the TDS packet header information in step 810 is accomplished by the logic of the TdsOutputStream object 516. Because the TDS packet header indicates the size of the TDS packet, the size of the TDS packet must be determined prior to the TdsOutputStream object 516 adding the header. It should be noted that one or multiple SSL packets can be transmitted as TDS packet data (e.g., the TDS packet can contain three SSL packets, etc.), and the number of SSL packets transmitted in each TDS packet can vary (e.g., between one and three) from one TDS packet to the next. Thus, the TDS packet header information cannot be added until the logic of the TdsOutputStream object 516 determines that the TDS packet is complete.

Traditionally, determining if the TDS packet is complete would be difficult for a JSSE client, because the JSSE client does not determine the end of a block of data in the manner used by other systems. Specifically, the JSSE client does not call the method flush( ), which signals that data is ready to be sent to a server, thereby indicating the end of a data block. The JSSE client also does not write the data for the TDS packet as a single block, which would allow for data to be sent to a server after each write operation, thereby indicating the end of a data block. Moreover, the JSSE client does not perform a check to see if data sent are written to the TDS packet, which would indicate the end of a block of data.

To avoid the above-problems traditionally experienced using JSSE clients, one or more embodiments of the invention use a synchronous handshake protocol between the server 110*a* and the client 110*b*. Using a synchronous handshake protocol, each packet (e.g., TDS packet) sent to the server 110*a* (e.g., a MS SQL Server) from the client 110*b* (e.g., a JSSE client) is answered with a single packet. Thus, the count of written and read packets (e.g., TDS packets) is equal, and each packet sent to the server 110*a* includes all data the server 110*a* requires to create a response. According to one or more embodiments of the invention, data is flushed from the TdsOutputStream object 516 if a "read" operation by the TdsInputStream object 514 occurs, and the input buffer of the TdsInputStream object 514 is empty.

Once the TDS packet header information has been added by the TdsOutputStream object 516 in step 810, the TDS packet (including the SSL packet information) is transmitted to the server 110*a* in step 811 by either the FileOutputStream object 526 or the SocketOutputStream object 416. In response to the received TDS packet, the server 110*a* creates a response TDS packet of type 4 (Server Response) in step 812 to be transmitted to the client 110*b*. The TDS packet includes an SSL packet of type 22 (Handshake) having the following three message types: Message Type 2 (Server Hello), Message Type 11 (Certificate), and Message Type 14 (Server Hello Down). The incoming data associated with the TDS packet transmitted to the client 110*b* is read in step 813 by either the FileInputStream object 524 or the SocketInputStream object 414. In Step 814, the TPS header information is removed from the TDS packet by the TdsInputStream object 514. The received SSL packet is processed by the SSLInputStream object 424 in step 816.

In Step 818, multiple SSL packets are produced by the SSLOutputStream object 426. Specifically, the SSLOutputStream object 426 produces three SSL packets: an SSL packet of type 22 (Handshake) with a message of type 16 (Client Key Exchange), an SSL Packet Type 20 (Change Cipher Specs.), and an SSL Packet Type 22 (Handshake). In step 820, the TdsOutputStream object 516 creates a TDS packet header indicating a packet of type 18 (Handshake) for the SSL packets produced in step 818. In step 821, the TDS packet is transmitted to the server 110*a* by either the FileOutputStream object 526 or the SocketOutputStream object 416. In response, in step 822, the server 110*a* produces and transmits a TDS packet header of type 4 (Server Response) having an SSL Packet of type 22 (Handshake) including a message of type 20 (Finished) to the client 110*b*.

The client 110*b* reads the incoming data (i.e., the incoming TPS packet) in step 823 using either the FileInputStream object 524 or the SocketInputStream object 414. Once the SSL packet of type 22 (Handshake) including a message of type 20 (Finished), is transmitted to the client 110*b*, the SSL handshake protocol is complete, and SSL data can be effectively and securely transmitted between the sever 110*a* and the client 110*b*. According to one or more embodiments of the invention, the message type "Finished" for a "Handshake" message can be detected by the TdsSocket object 512, and from that point forward, TDS the header functionality of the TdsOutputStream object 516 can be temporarily disabled (until it is required for a subsequent TDS handshake protocol). According to one or more alternative embodiments of the invention, the end of the SSL handshake can be detected by the start of SSL "Data" packet transmissions (i.e., transmissions of SSL packets of type 23), which occurs after the SSL handshake. By detecting the end of the SSL handshake according to when SSL "Data" packet transmissions begin, errors in the handshake process (e.g., handshake messages erroneously indicating a message type "Finished") will not adversely affect the handshake process or secure data transmission after the handshake process.

In step 824, the TdsInputStream object 514 removes the TDS header from the TDS packet received from the server 110*a*. The received SSL packet is processed by the SSLInputStream object 424 in step 826. An SSL packet of type 23 (Data) is created in step 828 by the SSLOutputStream object 426, and the SSL packet is prepared for transmission to the server 110*a* (e.g., sent to either the FileOutputStream object 526 or the SocketOutputStream object 416) in step 830 by the TdsOutputStream object 516, which has its TDS header functionality temporarily disabled. The SSL packet data is then sent in step 831 by either the FileOutputStream object 526 or the SocketOutputStream object 416. As the TDS header functionality of the TdsOutputStream object 516 is temporarily disabled, the SSL packet is transmitted directly to the server 110*a* in step 831 without alteration (e.g., without the addition of TDS header information). The server 110*a* responds by creating and transmitting an SSL packet of type 23 (Data) to the client 110*b* in step 832. The SSL "Data" packet transmissions can continue between the server 110*a* and the client 110*b* in the same manner until a pre-determined number of data packets have been transmitted, or until the SSL session is terminated by either the server 110*a* or the client 110*b*. For example, the session can be terminated by a pre-determined time limit expiring, or by some other terminating event occurring.

From the foregoing, it can be seen that systems and methods that provide translation of secure communications for handshake protocols are provided. Specific embodiments have been described above in connection with a client that uses a standard library for secure communications (e.g., communications using SSL) and a server that uses a proprietary handshake protocol (e.g., an SQL server) to carry out a handshake associated with secure communications. Additionally, specific embodiments have been described in the context of a Java client using a JSSE SSL library and a JDBC Type 4 driver, and an MS SQL Server, such as the MS SQL Server 2000, or other versions.

It will be appreciated, however, that embodiments of the invention can be in other specific forms without departing from the spirit or essential characteristics thereof. For example, while some embodiments have been described in the context of a Java client and a SQL server, one or more embodiments of the invention can be used in other environments that require translation of secure communications for handshake protocols. For example, one or more embodiments of the invention can include other proprietary server protocols than those mentioned, which include a security handshake protocol, and which require translation for clients using standard security protocols, and corresponding standard handshake procedures to access the server. The presently disclosed embodiments are, therefore, considered in all respects to be illustrative and not restrictive.

What is claimed is:

1. A method, comprising:
   receiving data transmitted over a network, the receiving occurring via a Java client using a standard secure protocol library including a Java Database Connectivity (JDBC) Type 4 driver;
   determining whether a Tabular Data Stream (TDS) handshake protocol is required to handle the received data;
   initiating a TDS handshake protocol by the client, if it is determined that a TDS handshake protocol is required;
   determining whether the at least one portion of the data is encrypted; and
   initiating a secure protocol to handle the at least one portion of the data, if it is determined that the at least one portion of the data is encrypted.

2. The method of claim 1, wherein the initiating a secure protocol includes initiating a secure socket layer (SSL) protocol.

3. The method of claim 1, wherein the client is a pure Java client.

4. The method of claim 1, wherein the standard secure protocol library includes a Java Secure Socket Extension (JSSE).

5. The method of claim 1, wherein the secure protocol includes a secure socket layer (SSL) protocol, and the standard secure protocol library includes a standard SSL library.

6. The method of claim 1, wherein the received data is received from a server that uses a structured query language and a TDS handshake protocol.

7. The method of claim 1, wherein the data is received from a Microsoft Structured Query Language (MS SQL) server.

8. A method, comprising:
   receiving data transmitted by a Microsoft Structured Query Language (MS SQL) server over a network, the receiving occurring via a Java client using a standard secure protocol library including a Java Database Connectivity (JDBC) Type 4 driver;
   determining whether an MS SQL handshake protocol is required to handle the received data;
   initiating an MS SQL handshake protocol by the client, if it is determined that an MS SQL handshake protocol is required;
   determining whether the at least one portion of the data is encrypted; and
   initiating a secure protocol to handle the at least one portion of the data, if it is determined that the at least one portion of the data is encrypted.

9. The method of claim 8, wherein the initiating a secure protocol includes initiating a secure socket layer (SSL) protocol.

10. The method of claim 8, wherein the client is a pure Java client.

11. The method of claim 8, wherein the standard secure protocol library includes a Java Secure Socket Extension (JSSE).

12. The method of claim 8, wherein the secure protocol includes a secure socket layer (SSL) protocol, and the standard secure protocol library includes a standard SSL library.

13. A processor-readable medium storing code representing instructions to cause a processor to perform a process, the code comprising code to:
   receive data transmitted over a network via a Java client using a standard secure protocol library including a Java Database Connectivity (JDBC) Type 4 driver;
   determine whether a Tabular Data Stream (TDS) handshake protocol is required to handle the received data;
   initiate a TDS handshake protocol by the client, if it is determined that a TDS handshake protocol is required;
   determine whether the at least one portion of the data is encrypted; and
   initiate a secure protocol to handle the at least one portion of the data, if it is determined that the at least one portion of the data is encrypted.

14. The processor-readable medium of claim 13, wherein the client using a standard secure protocol library includes a pure Java client using a standard secure socket layer (SSL) library.

15. A processor-readable medium storing code representing instructions to cause a processor to perform a process, the code comprising code to:
   receive data transmitted by a Microsoft Structured Query Language (MS SQL) server over a network via a Java client using a standard secure protocol library including a Java Database Connectivity (JDBC) Type 4 driver;
   determine whether an MS SQL handshake protocol is required to handle the received data;
   initiate an MS SQL handshake protocol by the client, if it is determined that an MS SQL handshake protocol is required;
   determine whether the at least one portion of the data is encrypted; and
   initiate a secure protocol to handle the at least one portion of the data, if it is determined that the at least one portion of the data is encrypted.

16. The processor-readable medium of claim 15, wherein the client using a standard secure protocol library includes a pure Java client using a standard secure socket layer (SSL) library.

17. A method, comprising:
   preparing data to be transmitted to a server from a Java client using a standard secure protocol library including a Java Database Connectivity (JDBC) Type 4 driver;
   determining if a Tabular Data Stream (TDS) handshake protocol is required to communicate with the server;
   initiating a TDS handshake protocol, if it is determined that a TDS handshake protocol is required;
   determining if data to be transmitted is to be encrypted using a standard secure protocol associated with the standard secure protocol library; and
   initiating the standard secure protocol, if it is determined that the data is to be encrypted using the standard secure protocol.

18. The method of claim 17, further comprising:
   transmitting encrypted data using the standard secure protocol.

19. The method of claim 17, wherein the initiating the standard secure protocol includes initiating a secure socket layer (SSL) protocol.

20. The method of claim 17, wherein the client is a pure Java client.

21. The method of claim 17, wherein the standard secure protocol library includes a Java Secure Socket Extension (JSSE).

22. The method of claim 17, wherein the standard secure protocol includes a secure socket layer (SSL) protocol, and the standard secure protocol library includes a standard SSL library.

23. The method of claim 17, wherein the data is received from a Microsoft Structured Query Language (MS SQL) server.

24. A method, comprising:
preparing data to be transmitted to a server from a Java client using a standard secure protocol library including a Java Database Connectivity (JDBC) Type 4 driver;
determining if a Microsoft Structured Query Language (MS SQL) server handshake protocol is required to communicate with the server;
initiating an MS SQL handshake protocol, if it is determined that an MS SQL handshake protocol is required;
determining if data to be transmitted is to be encrypted using a standard secure protocol associated with the standard secure protocol library; and
initiating the standard secure protocol, if it is determined that the data is to be encrypted using the standard secure protocol.

25. The method of claim 24, further comprising:
transmitting encrypted data using the standard secure protocol.

26. The method of claim 24, wherein the initiating the standard secure protocol includes initiating a secure socket layer (SSL) protocol.

27. The method of claim 24, wherein the client is a pure Java client.

28. The method of claim 24, wherein the standard secure protocol library includes a Java Secure Socket Extension (JSSE).

29. The method of claim 24, wherein the standard secure protocol includes a secure socket layer (SSL) protocol, and the standard secure protocol library includes a standard SSL library.

30. A processor-readable medium storing code representing instructions to cause a processor to perform a process, the code comprising code to:
prepare data to be transmitted to a server from a Java client using a standard secure protocol library including a Java Database Connectivity (JDBC) Type 4 driver;
determine if a Tabular Data Stream (TDS) handshake protocol is required to communicate with the server;
initiate a TDS handshake protocol, if it is determined that a TDS handshake protocol is required;
determine if data to be transmitted is to be encrypted using a standard secure protocol associated with the standard secure protocol library; and
initiate the standard secure protocol, if it is determined that the data is to be encrypted using the standard secure protocol.

31. The processor-readable medium of claim 30, wherein the client using a standard secure protocol library includes a pure Java client using a standard secure socket layer (SSL) library.

32. A processor-readable medium storing code representing instructions to cause a processor to perform a process, the code comprising code to:
prepare data to be transmitted to a server from a Java client using a standard secure protocol library including a Java Database Connectivity (JDBC) Type 4 driver;
determine if a Microsoft Structured Query Language (MS SQL) server handshake protocol is required to communicate with the server;
initiate an MS SQL handshake protocol, if it is determined that an MS SQL handshake protocol is required;
determine if data to be transmitted is to be encrypted using a standard secure protocol associated with the standard secure protocol library; and
initiate the standard secure protocol, if it is determined that the data is to be encrypted using the standard secure protocol.

33. The processor-readable medium of claim 32, wherein the client using a standard secure protocol library includes a pure Java client using a standard secure socket layer (SSL) library.

34. A system, comprising:
a first client application configured to transmit and to receive secure communications via a network using a standard secure protocol library, the secure communications including queries sent by the first client application and responses received by the first client application;
a server application configured to receive the queries sent by the first client application via the network and to transmit the responses received by the first client application via the network, the server application requiring a proprietary server handshake protocol to communicate with the first client application using a standard secure protocol associated with the standard secure protocol library;
a translation component configured to receive the queries sent by the first client application and to translate the queries into queries that use the proprietary server handshake protocol of the server application so that they are understandable to the server application, the translation component further configured to receive the responses transmitted by the server application and to translate the responses into responses that do not require use of the proprietary server handshake protocol such that they are understandable by the first client.

35. The system of claim 34, wherein the standard secure protocol library includes a standard secure socket layer (SSL) library.

36. The system of claim 34, wherein the first client application includes a pure Java client.

37. The system of claim 34, wherein the first client application includes a Java client using a Java Database Connectivity (JDBC) Type 4 driver.

38. The system of claim 34, wherein the standard secure protocol library includes a Java Secure Socket Extension (JSSE).

39. The system of claim 34, wherein the server application uses a structured query language and the proprietary server handshake protocol includes a Tabular Data Stream (TDS) handshake protocol.

40. The system of claim 34, wherein the server application is a Microsoft Structured Query Language (MS SQL) server and the proprietary server handshake protocol includes an MS SQL server handshake protocol.

41. The system of claim 34, wherein the first client application is further configured to communicate using sockets, the server application is configured to communicate using named pipes, and the translation component is configured to translate communications between sockets and named pipes.

42. An apparatus, comprising:
a secure data communication object configured to receive secure communication data as input and to output secure communication data;

a socket communication object configured to receive socket communication data as input and to output socket communication data;

a named pipe communication object configured to receive named pipe communication data as input and to output named pipe communication data; and a translation communication object in communication with each of the secure data communication object, the socket communication object, and the named pipe communication object, the translation communication object configured to translate named pipe communication data received via the named pipe communication object for handling by the secure data communication object, the translation communication object being further configured to send socket communication data received via the socket communication object to the secure data communication object, the translation communication object including a Tabular Data Stream (TDS) handshake object configured to perform a TDS handshake with a TDS client, the TDS handshake object further configured to translate TDS data to a non-TDS data format and non-TDS data to TDS data format.

43. The apparatus of claim 42, wherein the translation component is further configured to translate secure communication data received via the secure communication object for handling by the named pipe communication object, the translation communication object being further configured to send secure communication data received via the secure communication object to the socket data communication object.

44. The apparatus of claim 42, wherein the secure communication object includes a Secure Socket Layer (SSL) communication object.

45. The apparatus of claim 42, wherein the secure communication object includes a Java client using a standard Secure Socket Layer (SSL) library.

46. A method, comprising:
receiving data transmitted over a network, the receiving occurring via a client using a standard secure protocol library, the standard secure protocol library including a Java Secure Socket Extension (JSSE);
determining whether a Tabular Data Stream (TDS) handshake protocol is required to handle the received data;
initiating a TDS handshake protocol by the client, if it is determined that a TDS handshake protocol is required;
determining whether the at least one portion of the data is encrypted; and
initiating a secure protocol to handle the at least one portion of the data, if it is determined that the at least one portion of the data is encrypted.

47. A method, comprising:
receiving data transmitted by a Microsoft Structured Query Language (MS SQL) server over a network, the receiving occurring via a client using a standard secure protocol library, the standard secure protocol library including a Java Secure Socket Extension (JSSE);
determining whether an MS SQL handshake protocol is required to handle the received data;
initiating an MS SQL handshake protocol by the client, if it is determined that an MS SQL handshake protocol is required;
determining whether the at least one portion of the data is encrypted; and
initiating a secure protocol to handle the at least one portion of the data, if it is determined that the at least one portion of the data is encrypted.

48. A method, comprising:
preparing data to be transmitted to a server from a client using a standard secure protocol library, the standard secure protocol library including a Java Secure Socket Extension (JSSE);
determining if a Tabular Data Stream (TDS) handshake protocol is required to communicate with the server;
initiating a TDS handshake protocol, if it is determined that a TDS handshake protocol is required;
determining if data to be transmitted is to be encrypted using a standard secure protocol associated with the standard secure protocol library; and
initiating the standard secure protocol, if it is determined that the data is to be encrypted using the standard secure protocol.

49. A method, comprising:
preparing data to be transmitted to a server from a client using a standard secure protocol library, the standard secure protocol library including a Java Secure Socket Extension (JSSE);
determining if a Microsoft Structured Query Language (MS SQL) server handshake protocol is required to communicate with the server;
initiating an MS SQL handshake protocol, if it is determined that an MS SQL handshake protocol is required;
determining if data to be transmitted is to be encrypted using a standard secure protocol associated with the standard secure protocol library; and
initiating the standard secure protocol, if it is determined that the data is to be encrypted using the standard secure protocol.

50. A system, comprising:
a first client application configured to transmit and to receive secure communications via a network using a standard secure protocol library, the first client application including a Java client using a Java Database Connectivity (JDBC) Type 4 driver, the secure communications including queries sent by the first client application and responses received by the first client application;
a server application configured to receive the queries sent by the first client application via the network and to transmit the responses received by the first client application via the network, the server application requiring a proprietary server handshake protocol to communicate with the first client application using a standard secure protocol associated with the standard secure protocol library;
a translation component configured to receive the queries sent by the first client application and to translate the queries into queries that use the proprietary server handshake protocol of the server application so that they are understandable to the server application.

51. A system, comprising: a first client application configured to transmit and to receive secure communications via a network using a standard secure protocol library, the standard secure protocol library including a Java Secure Socket Extension (JSSE), the secure communications including queries sent by the first client application and responses received by the first client application;
a server application configured to receive the queries sent by the first client application via the network and to transmit the responses received by the first client application via the network, the server application requiring a proprietary server handshake protocol to communicate with the first client application using a standard secure protocol associated with the standard secure protocol library;

a translation component configured to receive the queries sent by the first client application and to translate the queries into queries that use the proprietary server handshake protocol of the server application so that they are understandable to the server application.

52. A system, comprising:

a first client application configured to transmit and to receive secure communications via a network using a standard secure protocol library, the secure communications including queries sent by the first client application and responses received by the first client application;

a server application configured to receive the queries sent by the first client application via the network and to transmit the responses received by the first client application via the network, the server application requiring a proprietary server handshake protocol to communicate with the first client application using a standard secure protocol associated with the standard secure protocol library;

a translation component configured to receive the queries sent by the first client application and to translate the queries into queries that use the proprietary server handshake protocol of the server application so that they are understandable to the server application, the first client application configured to communicate using sockets, the server application is configured to communicate using named pipes, and the translation component is configured to translate communications between sockets and named pipes.

53. An apparatus, comprising:

a secure data communication object configured to receive secure communication data as input and to output secure communication data;

a socket communication object configured to receive socket communication data as input and to output socket communication data;

a named pipe communication object configured to receive named pipe communication data as input and to output named pipe communication data; and a translation communication object in communication with each of the secure data communication object, the socket communication object, and the named pipe communication object, the translation communication object configured to translate named pipe communication data received via the named pipe communication object for handling by the secure data communication object, the translation communication object being further configured to send socket communication data received via the socket communication object to the secure data communication object, the translation component being further configured to translate secure communication data received via the secure communication object for handling by the named pipe communication object, the translation communication object being further configured to send secure communication data received via the secure communication object to the socket data communication object.

* * * * *